US012609245B2

(12) United States Patent
Ogihara et al.

(10) Patent No.: US 12,609,245 B2
(45) Date of Patent: Apr. 21, 2026

(54) DIELECTRIC COMPOSITION, DIELECTRIC FILM, AND CAPACITOR

(71) Applicant: Panasonic Intellectual Property Management Co., Ltd., Osaka (JP)

(72) Inventors: Yusuke Ogihara, Osaka (JP); Hiroyuki Maeshima, Hyogo (JP); Nobuyuki Matsuzawa, Osaka (JP); Hideyuki Morita, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 897 days.

(21) Appl. No.: 17/776,530

(22) PCT Filed: Nov. 5, 2020

(86) PCT No.: PCT/JP2020/041420
§ 371 (c)(1),
(2) Date: May 12, 2022

(87) PCT Pub. No.: WO2021/095640
PCT Pub. Date: May 20, 2021

(65) Prior Publication Data

US 2022/0399166 A1 Dec. 15, 2022

(30) Foreign Application Priority Data

Nov. 14, 2019 (JP) ................................ 2019-206578

(51) Int. Cl.
*H01G 4/18* (2006.01)
*C08G 63/685* (2006.01)
(Continued)

(52) U.S. Cl.
CPC ................ *H01G 4/18* (2013.01); *C08L 67/04* (2013.01); *H01G 4/30* (2013.01); *H01G 4/32* (2013.01)

(58) Field of Classification Search
None
See application file for complete search history.

(56) References Cited

U.S. PATENT DOCUMENTS

2017/0327614 A1 11/2017 Kim et al.
2018/0323386 A1 11/2018 Eggert et al.
2019/0010291 A1* 1/2019 Choi .................. C08G 73/1039

FOREIGN PATENT DOCUMENTS

CN 106701105 A 5/2017
JP 06287287 A * 10/1994 ........... C08G 63/685
(Continued)

OTHER PUBLICATIONS

Teoh et al., "Effect of Pyridazine Structure On Thin-Film Polymerization and Phase Behavior of Thermotropic Liquid Crystalline Copolyesters," Journal of Polymer Science, Part B, 43(16), pp. 2230-2242 (2005) (Year: 2005).*
(Continued)

*Primary Examiner* — Ha S Nguyen
(74) *Attorney, Agent, or Firm* — Rimon P.C.

(57) ABSTRACT

A dielectric composition includes a polymer having a repeating structure of a unit structure including at least one heterocycle and at least one carbonyl group. The unit structure preferably includes at least one chemical structure including the at least one heterocycle and the at least one carbonyl group bonded to the at least one heterocycle.

13 Claims, 1 Drawing Sheet

(51) Int. Cl.

| | |
|---|---|
| ***C08G 64/00*** | (2006.01) |
| ***C08L 67/04*** | (2006.01) |
| ***C08L 69/00*** | (2006.01) |
| ***C08L 101/02*** | (2006.01) |
| ***H01G 4/30*** | (2006.01) |
| ***H01G 4/32*** | (2006.01) |

(56) References Cited

FOREIGN PATENT DOCUMENTS

| | | | | | |
|---|---|---|---|---|---|
| JP | H06-325984 | A | | 11/1994 | |
| JP | H09-68620 | A | | 3/1997 | |
| JP | 2008-112147 | A | | 5/2008 | |
| JP | 2016-008323 | A | | 1/2016 | |
| JP | 2017037136 | A | * | 2/2017 | |
| JP | 2017-203150 | A | | 11/2017 | |
| JP | 2018-537561 | A | | 12/2018 | |
| JP | 2019-007026 | A | | 1/2019 | |
| WO | WO-2018004195 | A1 | * | 1/2018 | .............. C08L 79/08 |

OTHER PUBLICATIONS

Chung et al., "Preparation of 3,6-Bis(hydroxymethyl)pyridazine and Poly(3,6-pyridazinediylbis(methylene) terephthalate," Marcomolecules, 19, pp. 25-32 (1986) (Year: 1986).*

Baldwin et al., "Effect of Incorporating Aromatic and Chiral Groups on the Dielectric Properties of Poly(dimethyltin esters)," Marcomolecular Rapid Communications, 35, pp. 2082-2088 (2015) (Year: 2015).*

Zu et al., "Syntheses of poly(benzenediol 3-oxy-1,5-pentanedioic esters) and study of their liquid crystalline behavior," Huadong Huagong Xueyuan Xuebao, vol. 17(6), pp. 754-760 (1991). (Year: 1991).*

International Search Report dated Jan. 26, 2021 issued in International Patent Application No. PCT/JP2020/041420, with English translation.

Aaron F. Baldwin et al., "Effect of Incorporating Aromatic and Chiral Groups on the Dielectric Properties of Poly (dimethyltin esters)," Macromolecular Rapid Communications, 2014, 35, 2082-2088.

Chinese Office Action dated Aug. 5, 2023 issued for the corresponding Chinese Patent Application No. 202080073240.8, with English translation.

* cited by examiner

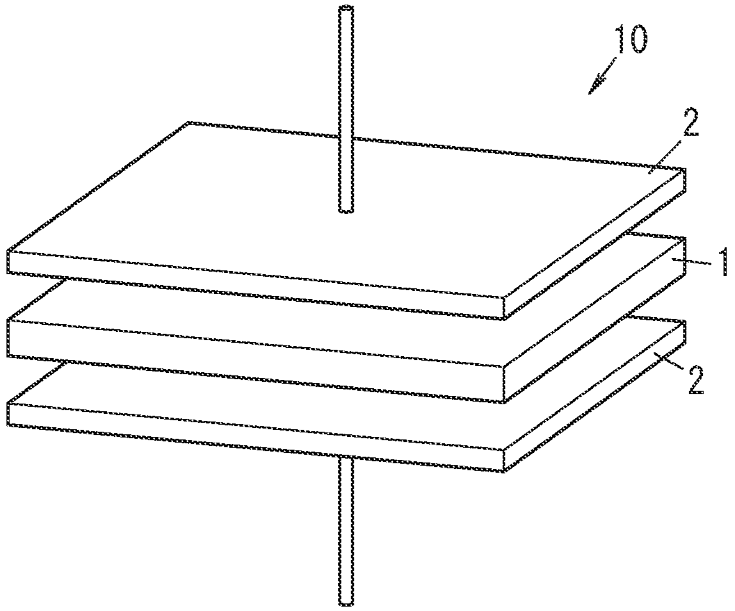
10
2
1
2

DIELECTRIC COMPOSITION, DIELECTRIC FILM, AND CAPACITOR

CROSS-REFERENCE OF RELATED APPLICATIONS

This application is the U.S. National Phase under 35 U.S.C. § 371 of International Patent Application No. PCT/JP2020/041420, filed on Nov. 5, 2020, which in turn claims the benefit of Japanese Patent Application No. 2019-206578, filed on Nov. 14, 2019, the entire disclosures of which Applications are incorporated by reference herein.

TECHNICAL FIELD

The present disclosure relates to dielectric compositions, dielectric films, and capacitors and more specifically, to a dielectric composition which includes a polymer, a dielectric film, and a capacitor.

BACKGROUND ART

Patent Document 1 describes a film capacitor element. The film capacitor element includes a stack obtained by at least stacking: a dielectric membrane layer including a polyurea film; and a metal-evaporated film layer.

In order to increase the capacitance of the film capacitor element described in Patent Document 1 without changing the type of a dielectric in the dielectric membrane layer, the thickness of the dielectric membrane layer has to be reduced. However, the level of processing difficulty in reducing the thickness of the dielectric membrane layer is high, and the reducing of the thickness of the dielectric membrane layer may easily lead to insulation breakdown.

Patent Document 1 describes polyurea as a dielectric having a high permittivity. However, the polyurea includes an amide bond represented by chemical structural formula. (I). Decomposition of the amide bond produces amine. Adsorption of the amine on metal may result in corrosion of the metal, and therefore, the dielectric preferably includes no amide bond.

[Formula 1]

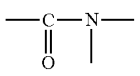

(1)

CITATION LIST

Patent Document

Patent Document 1: JP 2016-8323 A

SUMMARY OF INVENTION

It is an object of the present disclosure to provide a dielectric composition which includes no amide bond and which have a high permittivity, a dielectric film, and a capacitor.

A dielectric composition according to an aspect of the present disclosure includes a polymer having a repeating unit of a unit structure including at least one heterocycle and at least one carbonyl group.

A dielectric film according to an aspect of the present disclosure includes the dielectric composition.

A capacitor according to an aspect of the present disclosure includes the dielectric film.

BRIEF DESCRIPTION OF DRAWINGS

FIG. 1 is a schematic view of a capacitor according to the present embodiment.

DESCRIPTION OF EMBODIMENTS

Embodiment

(1) Overview

With the recent widespread distribution of electric vehicles (EV) and hybrid electric vehicles, inverters that are responsible for motor control are also required to be downsized, and consequently, capacitors such as film capacitors which are components included in the inverters are also required to be downsized.

Examples of a method for downsizing a capacitor while maintaining the performance of the capacitor include reducing the thickness of a dielectric layer such as a dielectric film and making the dielectric layer of a substance having a high permittivity.

The level of processing difficulty in the reducing the thickness of a dielectric layer is high, and the reducing of the thickness of the dielectric layer easily leads to insulation breakdown. In contrast, the making of the dielectric layer of a substance having a high permittivity can increase the permittivity of the dielectric layer with no or almost no reduction in the thickness of the dielectric layer and can thereby increase the capacitance of the capacitor, and in addition, the insulation breakdown is less likely to occur for the sake of no or almost no reduction in the thickness of the dielectric layer.

The present disclosure provides a dielectric composition which includes no amide bond and which has a permittivity (of greater than or equal to 3.5) higher than the permittivity (of about 2.0 to 3.0) of a conventional polymer. The present disclosure further provides: a dielectric film which increases the capacitance of a capacitor with almost no reduction in the thickness of the dielectric film; and a capacitor including the dielectric film.

The dielectric composition according to the present embodiment includes a polymer (which may hereinafter be referred to as a polymer (P)) having a repeating unit of a unit structure including at least one heterocycle and at least one carbonyl group. This provides a polymer (P) including few methylene groups ($—CH_2—$) in the unit structure and including a large amount of an oxygen element (O) and a nitrogen element (N) in the unit structure, thereby increasing the permittivity of the dielectric composition including the polymer (P).

The dielectric film according to the present embodiment includes the dielectric composition according to the present embodiment. This provides a film having a high permittivity.

The capacitor according to the present embodiment includes the dielectric film according to the present embodiment. Thus, in order to form a dielectric, layer between electrodes, the dielectric film having a high permittivity may be used, which easily increases the capacitance of the capacitor with no or almost no reduction in the thickness of the dielectric layer. The dielectric layer preferably includes no amide bond because the amine bond is a structure that produces amine that promotes corrosion. The capacitor according to the present embodiment includes no amide bond in the dielectric layer, is less likely to corrode, and is thus suitable as an in-vehicle capacitor.

(2) Details

(2.1) Dielectric Composition

The dielectric composition according to the present embodiment includes a polymer (P) having a repeating unit of a unit structure including at least one heterocycle and at least one carbonyl group. That is, the polymer (P) has a unit structure including one or a plurality of heterocycles and one or a plurality of carbonyl groups and has the unit structure as a repeating structure. Thus, the polymer (P) is a heterocyclic compound.

The heterocycle is a ring including at least two different elements. Examples of the elements included in the heterocycle include carbon, nitrogen, oxygen, and sulfur. Among these elements, the nitrogen element is preferably included in the heterocycle in order to obtain a dielectric composition having a high permittivity. That is, the unit structure includes a nitrogen heterocycle. Moreover, the heterocycle may be a three-membered ring, four-membered ring, five-membered ring, six-membered ring, or seven or more-membered ring. Among these rings, the five-membered ring or the six-membered ring is preferable for the heterocycle in order to stably obtain a dielectric composition having a high permittivity.

The carbonyl group is a functional group having a structure shown by —C(═O)—.

The unit structure including at least one heterocycle and at least one carbonyl group preferably includes at least one chemical structure including a heterocycle and a carbonyl group bonded to the heterocycle. That is, the unit structure including at least one heterocycle and at least one carbonyl group preferably has a chemical structure including the heterocycle and the carbonyl group bonded directly to each other. In this case, a dielectric composition having a high permittivity is stably obtained.

In the chemical structure including the heterocycle and the carbonyl group bonded directly to each other, another element is not present between the heterocycle and the carbonyl group, and an element (e.g., carbon) included in the heterocycle and a carbon atom in the carbonyl group are chemically bonded to each other. The chemical structure including the heterocycle and the carbonyl group bonded directly to each other is represented by, for example, the following chemical structural formula (A), (B), (C1), (C2), (D1), or (D3). In each of the chemical structural formulae (A), (B), (C1), (C2), (D1), and (D3), the carbon atom included in the heterocycle and the carbon atom of the carbonyl group are chemically bonded to each other.

In a chemical structure including a heterocycle and a carbonyl group not bonded directly to each other, another element (e.g., oxygen) is present between the heterocycle and the carbonyl group, and an element (e.g., carbon) included in the heterocycle and the carbon atom of the carbonyl group are chemically bonded to each other via the another element. The chemical structure including the heterocycle and the carbonyl group not bonded directly to each other is represented by, for example, the following chemical structural formulae (D2) or (D4). In each of the chemical structural formulae (D2) and (D4), the carbon atom included in the heterocycle and the carbon atom of the carbonyl group are chemically bonded to each other via an oxygen atom.

The chemical structural formulae (A), (B), (C1), (C2), (D1), (D2), (D3), and (D4) are shown below.

[Formula 2]

(A)

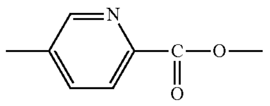

(B)

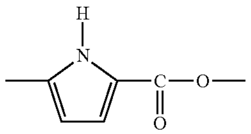

(C1)

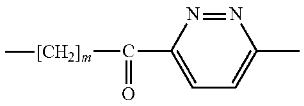

(C2)

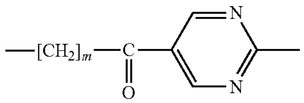

(D1)

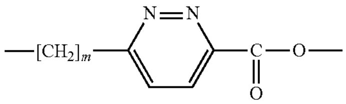

(D2)

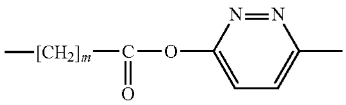

(D3)

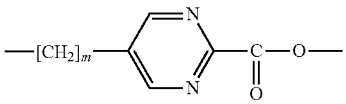

(D4)

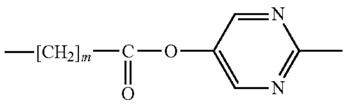

Here, in each of the chemical structural formulae (C1) and (C), m is an integer greater than or equal to 0 and less than or equal to 6. Moreover, in each of the chemical structural formulae (D1), (D2), (D3), and (D4), m is an integer greater than or equal to 0 and less than or equal to 5. In this case, a dielectric composition having a high permittivity is stably obtained.

Tables 1 to 4 show Examples 1 to 32 of the dielectric composition according to the present embodiment. In the column "chemical structural formula" of each Table, the chemical structural formula of the polymer (P) included in the dielectric composition in each example is shown. In the column "molecular weight" of each Table, the molecular weight of the polymer (P) included in the dielectric composition in each example is shown. The molecular weight was obtained by using a gel filtering chromatograph "GPC HEW-805" (manufactured by Showa Denko K.K.) and a differential refractometer "2414 RI detector" (manufactured by Nihon Waters K. K.) in combination with each other. In a measurement procedure of the molecular weight, each dielectric composition was first of all dissolved in a solution of hexafluoropropanol, and the solution was passed through the gel filtering chromatograph. Then, the solution passed through the gel filtering chromatograph was caused to flow into the differential refractometer to obtain an output, and from the output, a molecular weight range was computed. In the present disclosure, a method for measuring the molecular weight is not limited to the method described above. In the column "permittivity" of each Table, the permittivity of the dielectric composition of each example is shown.

A measurement method of the permittivity as described below was adopted. A parameter analyzer "HP4284A" (manufactured by Hewlett-Packard Company) was used. In a measurement procedure, a film of the dielectric composition of each example was formed, thereby forming a dielectric film. The dielectric film has a thickness of 2.3 μm to 3.0 μm and a breakdown voltage of 0.9 kV. Then, aluminum was vapor deposited onto both surfaces of the dielectric film, thereby forming electrodes thickness: 50 nm), and subsequently, the permittivity (relative permittivity) was obtained by the parameter analyzer at a room temperature (25° C.) and at a frequency of 1 kHz. In the present disclosure, a method for measuring the permittivity is not limited to the method described above.

In the column in which numbers of the examples are shown, the type (chemical structural formulae (A), (B), (C1), (C2), and (D1) to (D4)) and the value of m of the chemical structure which each polymer (P) has is shown.

TABLE 1

| | Chemical Structural Formula | Molecular Weight | Permittivity |
|---|---|---|---|
| Example 1 (A) | 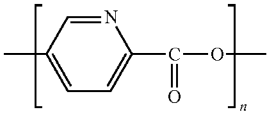 | 6.3€ $10^2$ to 2.8€ $10^6$ | 3.8 |
| Example 2 (B) | 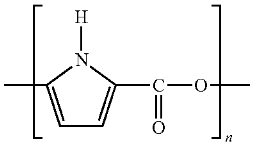 | 5.7€ $10^2$ to 2.6€ $10^6$ | 3.8 |

TABLE 1-continued

| | Chemical Structural Formula | Molecular Weight | Permittivity |
|---|---|---|---|
| Example 3 (C1, m = 0) | 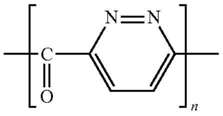 | 6.1€ $10^2$ to 2.8€ $10^6$ | 4.8 |
| Example 4 (C2, m = 0) | 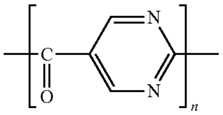 | 6.1€ $10^2$ to 2.8€ $10^6$ | 4.8 |
| Example 5 (D1, m = 0) | 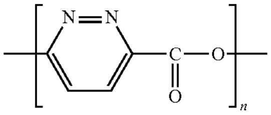 | 7.0€ $10^2$ to 3.1€ $10^6$ | 4.5 |
| Example 6 (D2, m = 0) | 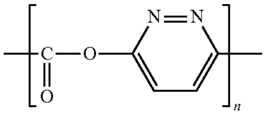 | 7.0€ $10^2$ to 3.1€ $10^6$ | 4.5 |
| Example 7 (D3, m = 0) | 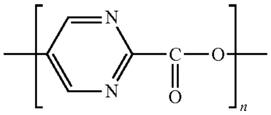 | 7.0€ $10^2$ to 3.1 € $10^6$ | 4.5 |
| Example 8 (D4, m = 0) | 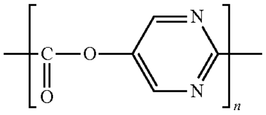 | 7.0€ $10^2$ to 3.1 € $10^6$ | 4.5 |

TABLE 2

| | Chemical Structural Formula | Molecular Weight | Permittivity |
|---|---|---|---|
| Example 9 (C1, m = 1) | 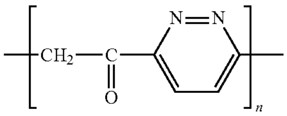 | 6.9 € $10^2$ to 3.1 € $10^6$ | 4.4 |
| Example 10 (C2, m = 1) | 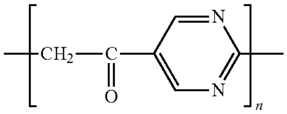 | 6.9 € $10^2$ to 3.1 € $10^6$ | 4.4 |
| Example 11 (D1, m = 1) | 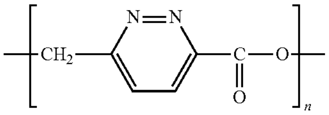 | 7.7 € $10^2$ to 3.5 € $10^6$ | 4.2 |
| Example 12 (D2, m = 1) | 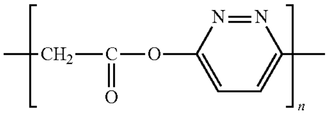 | 7.7 € $10^2$ to 3.5 € $10^6$ | 4.2 |

TABLE 2-continued

| | Chemical Structural Formula | Molecular Weight | Permittivity |
|---|---|---|---|
| Example 13 (D4, m = 1) | 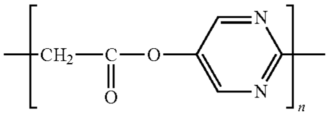 | 7.7 € $10^2$ to 3.5 € $10^6$ | 4.2 |
| Example 14 (D3, m = 1) | 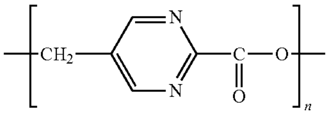 | 7.7 € $10^2$ to 3.5 € $10^6$ | 4.2 |
| Example 15 (C1, m = 4) | 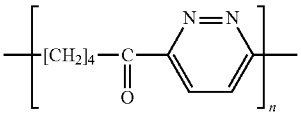 | 9.1 € $10^2$ to 4.1 € $10^6$ | 3.7 |
| Example 16 (C2, m = 4) | 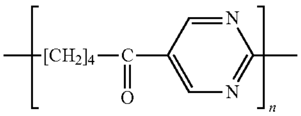 | 9.1 € $10^2$ to 4.1 € $10^6$ | 3.7 |

TABLE 3

| | Chemical Structural Formula | Molecular Weight | Permittivity |
|---|---|---|---|
| Example 17 (D1 m = 4) | 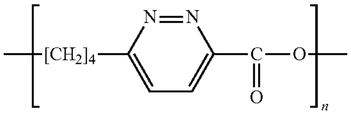 | 9.9€ $10^2$ to 4.5€ $10^6$ | 3.6 |
| Example 18 (D2 m = 4) | 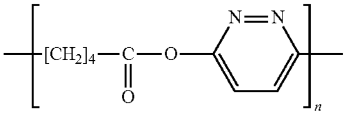 | 9.9€ $10^2$ to 4.5€ $10^6$ | 3.6 |
| Example 19 (D4 m = 4) | 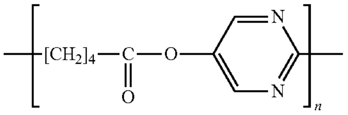 | 9.9€ $10^2$ to 4.5€ $10^6$ | 3.6 |
| Example 20 (D3 m = 4) | 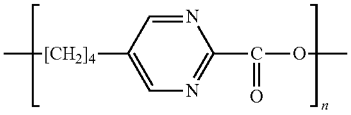 | 9.9€ $10^2$ to 4.5€ $10^6$ | 3.6 |
| Example 21 (C1, m = 6) | 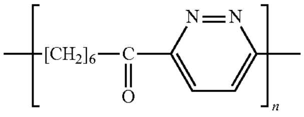 | 1.1€ $10^3$ to 4.7€ $10^6$ | 3.5 |
| Example 22 (C1, m = 7) | 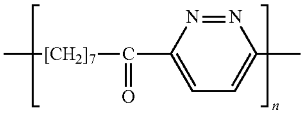 | 1.1€ $10^3$ to 5.1€ $10^6$ | 3.4 |

TABLE 3-continued

| | Chemical Structural Formula | Molecular Weight | Permittivity |
|---|---|---|---|
| Example 23 (C2, m = 6) | 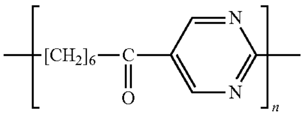 | 1.1€ $10^3$ to 4.5€ $10^6$ | 3.5 |
| Example 24 (C2, m = 7) | 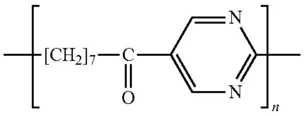 | 1.1€ $10^3$ to 5.1€ $10^6$ | 3.4 |

TABLE 4

| | Chemical Structural Formula | Molecular Weight | Permittivity |
|---|---|---|---|
| Example 25 (D1 m = 5) | 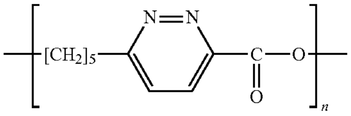 | 1.1€ $10^3$ to 5.1€ $10^6$ | 3.5 |
| Example 26 (D1 m = 6) | 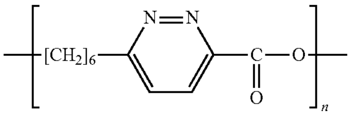 | 1.1€ $10^3$ to 5.4€ $10^6$ | 3.4 |
| Example 27 (D2 m = 5) | 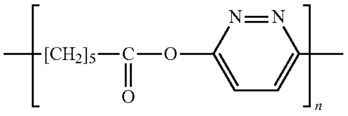 | 1.1€ $10^3$ to 5.1€ $10^6$ | 3.5 |

TABLE 4-continued

| | Chemical Structural Formula | Molecular Weight | Permittivity |
|---|---|---|---|
| Example 28 (D2 m = 6) | 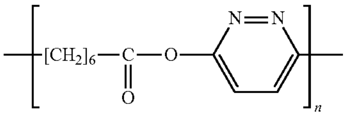 | 1.1€ $10^3$ to 5.4€ $10^6$ | 3.4 |
| Example 29 (D3, m = 5) | 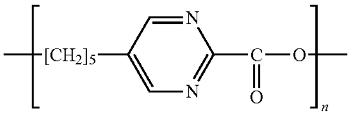 | 1.1€ $10^3$ to 5.1€ $10^6$ | 3.5 |
| Example 30 (D3, m = 6) | 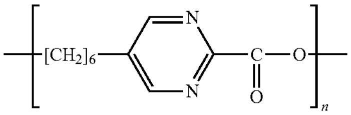 | 1.1€ $10^3$ to 5.4€ $10^6$ | 3.4 |
| Example 31 (D4, m = 5) | 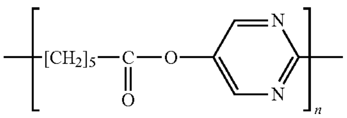 | 1.1€ $10^3$ to 5.1€ $10^6$ | 3.5 |
| Example 32 (D4, m = 6) | 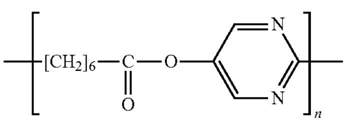 | 1.1€ $10^3$ to 5.4€ $10^6$ | 3.4 |

The dielectric composition according to the present embodiment includes the polymer (P) as a main component, and the content of the polymer (P) is preferably greater than or equal to 90 wt. % of the total amount of the dielectric composition. In this case, a dielectric film having a high permittivity, for example, is easily formed. In the dielectric composition according to the present embodiment, the content of the polymer (P) is more preferably greater than or equal to 95 wt. % of the total amount of the dielectric composition. The dielectric composition according to the present embodiment may include a solvent such as water, a polymerization initiator, a curing agent, and the like in addition to the polymer (P).

The dielectric composition according to the present embodiment may include two or more types of polymers (P) each having a structure whose unit structure is represented by any one of the chemical structural formulae (A), (B), (C1), (C2), (D1), (D2), (D3), or (D4). That is, the dielectric composition according to the present embodiment may include a plurality of types of polymers (P) having different chemical structures. In this case, the permittivity of the dielectric composition is adjustable.

A synthesis route of a polymer (PA) having, as the repeating unit, a unit structure represented by chemical structural formula (A) is shown below. In this case, the polymer (PA) may be synthesized by ester polymerization of a monomer (MA).

[Formula 3]

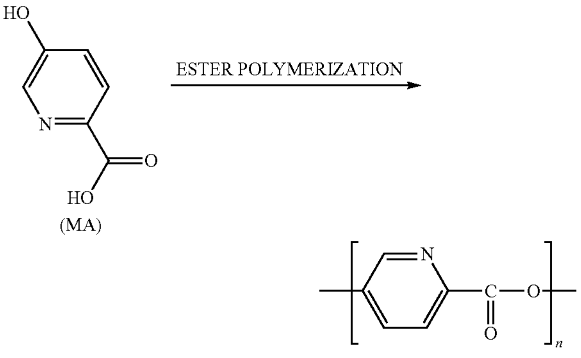

(MA)

(PA)

A synthesis route of a polymer (PB) having, as the repeating unit, a unit structure represented by chemical structural formula (B) is shown below. In this case, from a monomer (MB), an intermediate monomer (MB-1) is obtained, and then, from the intermediate monomer (MB-1), an intermediate monomer (MB-2) is obtained, and the ester polymerization of the intermediate monomer (MB-2) is carried out, thereby synthesizing the polymer (PB).

[Formula 4]

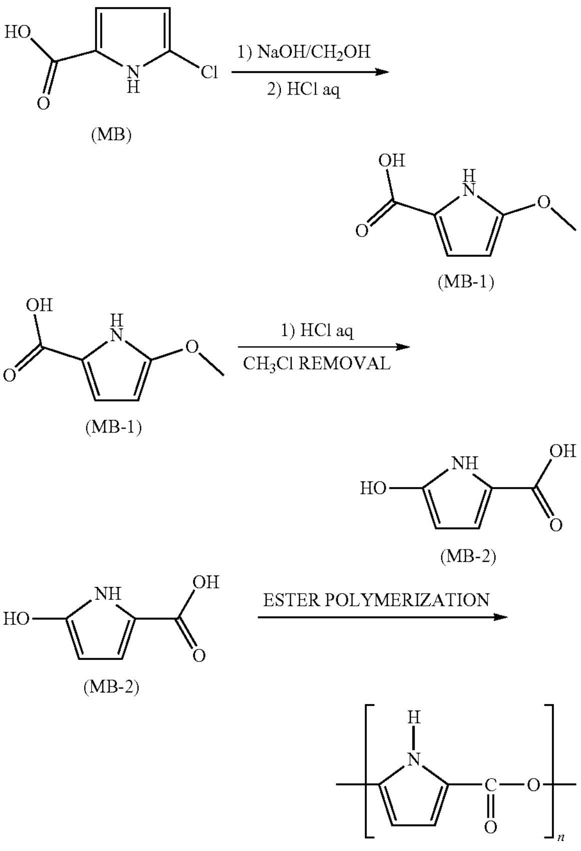

(MB)

(MB-1)

(MB-1)

(MB-2)

(MB-2)

(PB)

A synthesis route of a polymer (PC1) having, as the repeating unit, a unit structure represented by chemical structural formula (C1) is shown below. In this case (in the case where m≠0), a monomer (MC1) may be polymerized, thereby synthesizing the polymer (PC1).

[Formula 5]

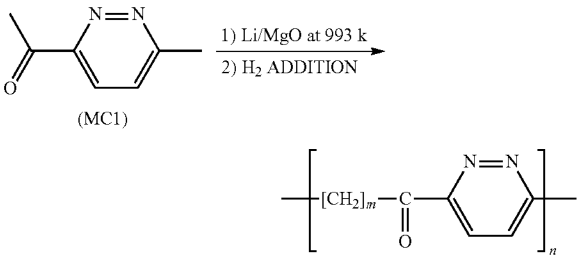

(MC1)

(PC1)

In the case where m=0, the polymer (PC) as the repeating unit, the unit structure represented by chemical structural formula (C1) may be synthesized by a synthesis route of [Formula 6].

[Formula 6]

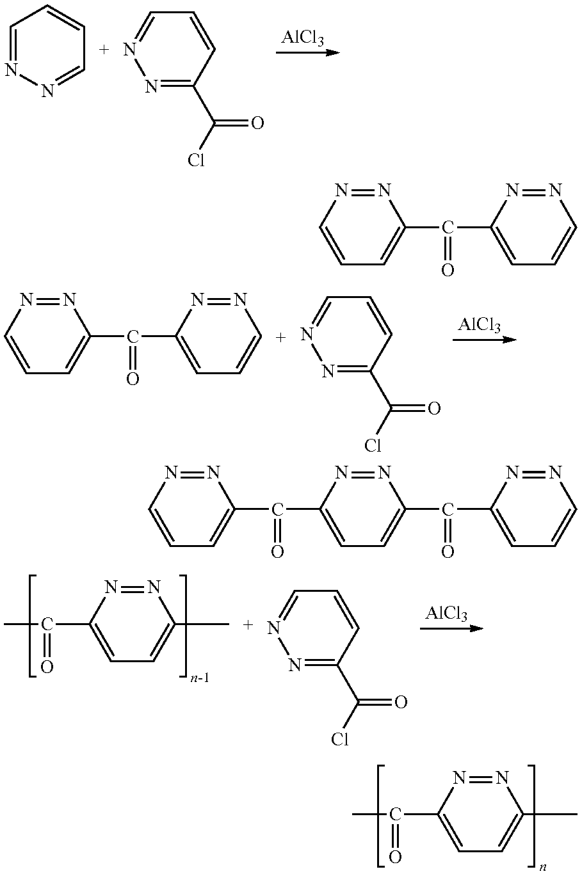

A synthesis route of a polymer (PC2) having, as the repeating unit, a unit structure represented by chemical structural formula (C2) is shown below. In this case (in the case where m≠0), a monomer (MC2) may be polymerized, thereby synthesizing the polymer (PC2).

[Formula 7]

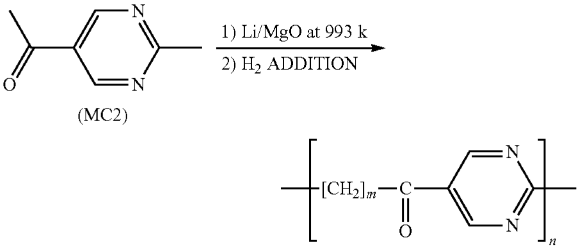

(MC2)

(PC2)

In the case where m=0, the polymer (PC2) having, as the repeating unit, the unit structure represented by chemical structural formula (C2) may be synthesized by a synthesis route of [Formula 8].

[Formula 8]

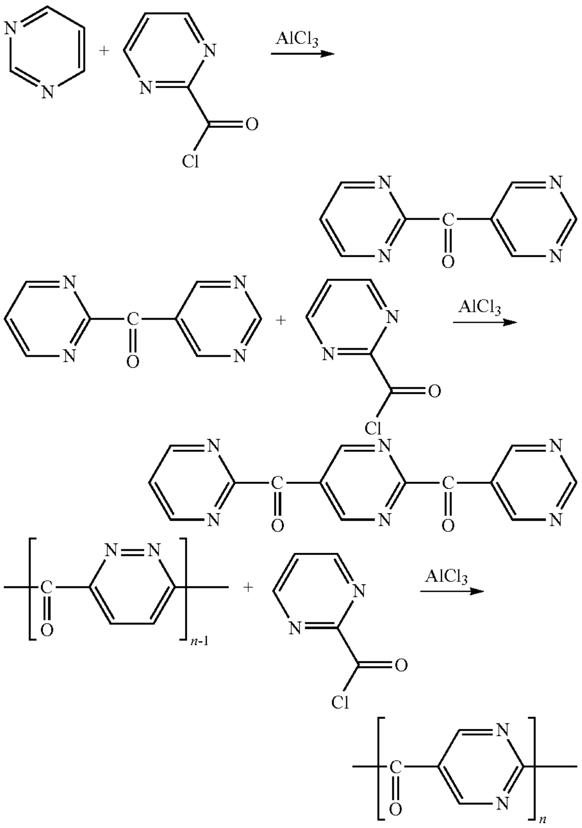

A synthesis route of a polymer (PD1), having, as the repeating unit, a unit structure represented by chemical structural formula (D1) is shown below. In this case (in the case of m≠0), from a monomer (MD1), an intermediate monomer (MD1-1) is obtained, and then, from the intermediate monomer (MD1-1), an intermediate monomer (MD1-2) is obtained, and thereafter, from the intermediate monomer (MD1-2), an intermediate monomer (MD1-3) is obtained, and the ester polymerization of the intermediate monomer (MD1-3) is carried out, thereby synthesizing the polymer (PD1).

[Formula 9]

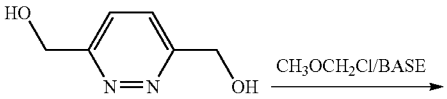

(MD1)

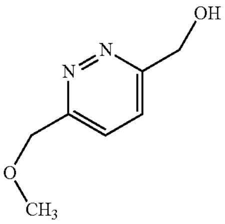

(MD1-1)

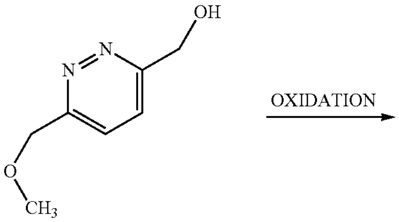

(MD1-1)

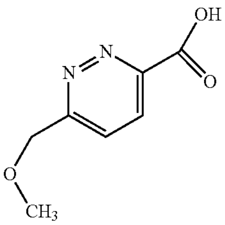

(MD1-2)

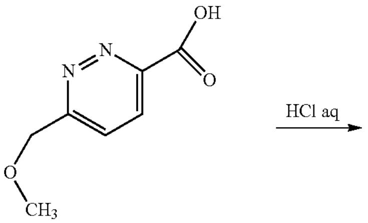

(MD1-2)

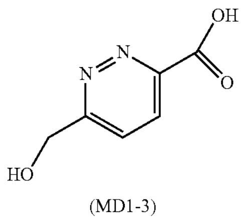

(MD1-3)

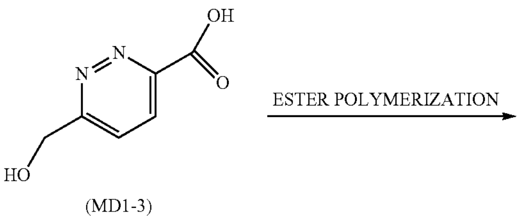

(MD1-3)

-continued

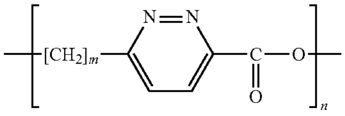

(PD1)

A synthesis route of a polymer (PD2) having, as the repeating unit, a unit structure represented by chemical structural formula (D2) is shown below. In this case (in the case where m≠0), from a monomer (MD2), an intermediate monomer (MD2-1) is obtained, and the ester polymerization of the intermediate monomer (MD2-1) is carried out, thereby synthesizing the polymer (PD2).

[Formula 10]

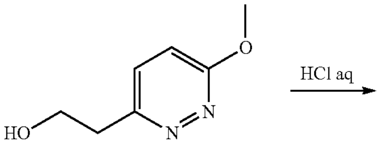

(MD2)

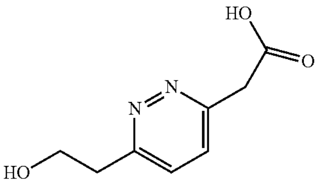

(MD2-1)

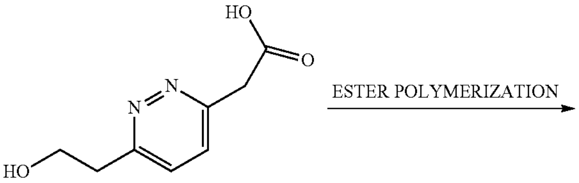

(MD2-1)

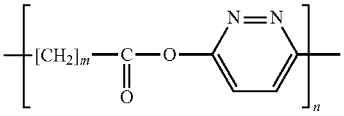

(PD2)

In the case where m=0, the polymer (PD1) or (PD2) having, as the repeating unit, the unit structure represented respectively by the chemical structural formula (D1) or (D2) may be produced by a synthesis route represented by [Formula 11]. Note that in the case where m=0, the PD1 and the PD2 are the same polymers.

[Formula 11]

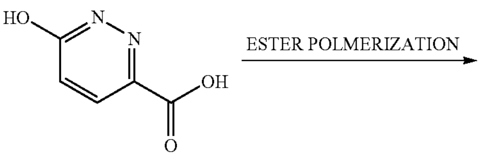

-continued

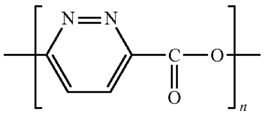

A synthesis route of a polymer (PD3) having, as the repeating unit, a unit structure represented by chemical structural formula (D3) is shown below. In this case (in the case where m≠0), reaction of a monomer (MD3) is caused in the presence of a hydrochloric acid aqueous solution to obtain an intermediate monomer (MD3-1), and then, the ester polymerization of the intermediate monomer (MD3-1) is carried out, thereby synthesizing the polymer (PD3).

[Formula 12]

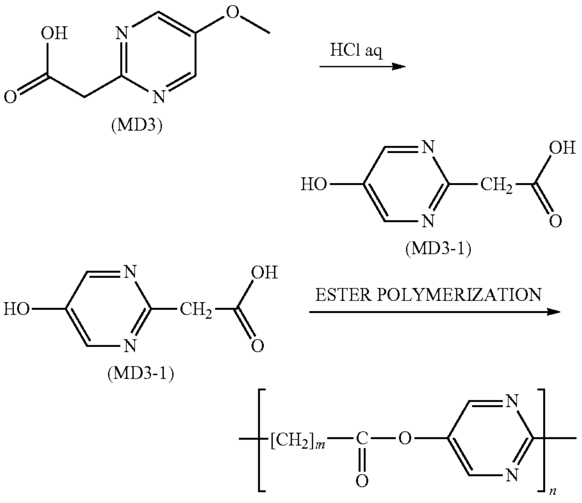

(MD3)

(MD3-1)

(MD3-1)

(PD3)

A synthesis route of a polymer (PD4) having, as the repeating unit, a unit structure represented by chemical structural formula (D4) is shown below. In this case (in the case where m≠0), the ester polymerization of a monomer (MD4) may be carried out, thereby synthesizing the polymer (PD4).

[Formula 13]

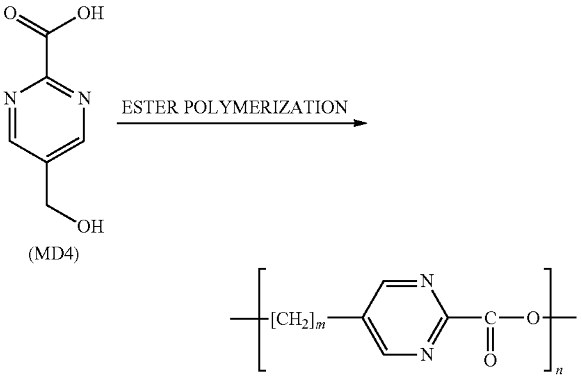

(MD4)

(PD4)

In the case where m=0, the polymer (PD3) or (PD4) having, as the repeating unit, the unit structure respectively represented by the chemical structural formula (D3) or (D4) may be produced by a synthesis route represented by [Formula 13], Note that when m=0, the PD3 and the PD4 are the same polymers.

[Formula 14]

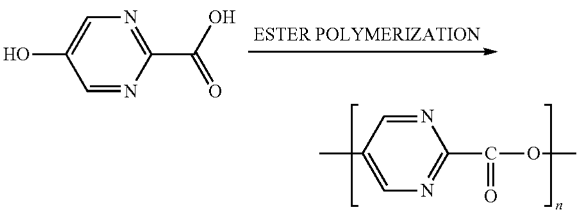

(2.2) Dielectric Film

The dielectric film according to the present embodiment includes the dielectric composition according to the present embodiment. Thus, the dielectric film according to the present embodiment includes the polymer (P), and therefore, the dielectric film has a high permittivity. The dielectric film according to the present embodiment may be formed by drying and curing the dielectric composition according to the present embodiment.

The dielectric film according to the present embodiment may be formed into a film by various methods. For example, a resin solution including the dielectric composition according to the present embodiment is applied to a carrier film and is then dried and cured, thereby forming the dielectric film according to the present embodiment. In this case, water or the like may be used as the solvent. Moreover, as the carrier film, a film, such as a PET film, having a high detachability may be used. In addition, heating may be performed during the drying and the curing.

The dielectric film according to the present embodiment may be molded into a film by, for example, the extrusion molding of the dielectric composition according to the present embodiment.

The dielectric film according to the present embodiment is formed into an appropriate thickness in accordance with the purpose of use. For example, when the dielectric film is to form a dielectric, layer of a capacitor, the thickness is preferably greater than or equal to 1.0 μm and less than or equal to 6.0 μm, more preferably greater than or equal to 2.3 μm and less than or equal to 3.0 μm. Moreover, when the dielectric film is to form the dielectric layer of the capacitor, the breakdown voltage is preferably higher than or equal to 0.9 kV.

(2,3) Capacitor

A capacitor 10 according to the present embodiment includes the dielectric film 1 according to the present embodiment. The capacitor 10 includes the dielectric film 1 as a dielectric layer. Thus, the capacitor 10 is formed such that the dielectric film 1 is provided between a pair of electrodes 2 (see FIG. 1). The electrodes 2 may be a thin electrode layer formed by vapor deposition of metal or may be metal foil. Examples of the metal included in the electrodes 2 include aluminum, zinc, copper, tin, and an alloy thereof, and aluminum or an aluminum alloy is preferably used.

The capacitance of the capacitor 10 increases as the area of the electrodes increases. Moreover, the capacitance of the capacitor 10 increases as the permittivity of the dielectric layer increases and also as the distance between the electrodes decreases. The capacitor 10 according to the present embodiment includes the dielectric film 1 having an increased permittivity and thus has increased capacitance.

(3) Variations

The embodiment is a mere example of various embodiments of the present disclosure. Various modifications may be made to the embodiment depending on design and the like as long as the object of the present disclosure is achieved.

The dielectric composition or the dielectric film according to the present embodiment is configured to form a dielectric mirror. That is, a plurality of layers of the dielectric composition or the dielectric film according to the present embodiment are formed on a glass substrate, thereby forming the dielectric mirror including a plurality of stacked dielectric layers.

The dielectric composition or the dielectric film according to the present embodiment is configured to form a heat conduction member. That is, the dielectric composition or the dielectric film according to the present embodiment may be formed as a member which conducts heat from a heat-producing component, such as a motor, a power generator, and a transformer, in order to improve dissipation of heat from the heat-producing component.

The dielectric composition or the dielectric film according to the present embodiment is configured to form an insulation layer included in a printed wiring board. That is, a resin substrate including the dielectric composition or the dielectric film according to the present embodiment may be formed, and on a surface of the resin substrate, a conductor may be formed, thereby providing the printed wiring board.

The capacitor 10 according to the present embodiment may be of either a wound type or a stacked type. The wound capacitor is formed by, for example, laying a dielectric film on a metal foil which will serve as an internal electrode and winding up the dielectric film and the metal foil in the form of a roll. The stacked capacitor is formed by, for example, alternately stacking metal foils which will serve as internal electrodes and dielectric films on one another.

For the capacitor 10 according to the present embodiment, a film of dielectric composition is formed, and then, polymerization of a polymer in the film and formation of electrodes by vapor deposition of metal on the film may be performed in the same step. In this case, formation of the dielectric film from the film and formation of vapor deposition electrodes can be efficiently performed.

SUMMARY

As explained above, a dielectric composition according to a first aspect having a repeating unit of a unit structure including at least one heterocycle and at least one carbonyl group.

With this aspect, a polymer (P) is obtained which includes few methylene groups ($—CH_2—$) in the unit structure and a large amount of an oxygen element (O) and a nitrogen element (N) in the unit structure, and thus, this aspect provides the advantage that the advantage that a dielectric composition having a high permittivity is easily obtained.

In a dielectric composition of a second aspect referring to the first aspect, the at least one heterocycle includes a nitrogen element.

This aspect provides the advantage that the advantage that a dielectric composition having a high permittivity is easily obtained.

In a dielectric composition of a third aspect referring to the first or second aspect, the unit structure includes at least one chemical structure including the at least one heterocycle and the at least one carbonyl group bonded to the at least one heterocycle.

This aspect provides the advantage that the advantage that a dielectric composition having a high permittivity is easily obtained.

In a dielectric composition of a fourth aspect referring to the third aspect, the at least one chemical structure includes a structure represented by chemical structural formula (A).

This aspect provides the advantage that the advantage that a dielectric composition having a high permittivity is easily obtained.

In a dielectric composition of a fifth aspect referring to the third aspect, the at least one chemical structure includes a structure represented by chemical structural formula (B).

This aspect provides the advantage that the advantage that a dielectric composition having a high permittivity is easily obtained.

In a dielectric composition of a sixth aspect referring to the third aspect, the at least one chemical structure includes a structure represented by chemical structural formula. (C1) or (C2). In each of the chemical structural formulae (C1) and (C2), m is an integer greater than or equal to 0.

This aspect provides the advantage that the advantage that a dielectric composition having a high permittivity is easily obtained.

In a dielectric composition of a seventh aspect referring to the sixth aspect, in each of the chemical structural formulae (C1) and (C2), m is an integer less than or equal to 6.

This aspect provides the advantage that the advantage that a dielectric composition having a high permittivity is easily obtained.

In a dielectric composition of an eighth aspect referring to the first aspect, the unit structure includes a structure represented by any one of chemical structural formula (D1), (D2), (D3), or (D4). In each of the chemical structural formulae (D1), (D2), (D3), and (D4), m is an integer greater than or equal to 0.

This aspect provides the advantage that the advantage that a dielectric composition having a high permittivity is easily obtained.

In a dielectric composition of a ninth aspect referring to the eighth aspect, in each of the chemical structural formulae (D1), (D2), (D3), and (D4), m is an integer less than or equal to 5.

This aspect provides the advantage that the advantage that a dielectric composition having a high permittivity is easily obtained.

In a dielectric composition of a tenth aspect referring to the first aspect, the unit structure includes two or more types of polymers each having a structure represented by any one of chemical structural formulae (A), (B), (C1), (C2), (D1), (D2), (D3), or (D4).

This aspect provides the advantage that the advantage that a dielectric composition having a high permittivity is easily obtained.

A dielectric film (I) of an eleventh aspect includes the dielectric composition of any one of the first to tenth aspects.

This aspect has the advantage that the advantage that a dielectric film having a high-permittivity is easily obtained.

A capacitor (10) of a twelfth aspect includes the dielectric film (1) of the eleventh aspect.

This aspect provides the advantage that a capacitor having a large capacitance is easily obtained without reducing the thickness of the dielectric film (1).

REFERENCE SIGNS LIST

1 Dielectric Film
10 Capacitor

The invention claimed is:

1. A dielectric composition comprising a polymer having a repeating unit of a unit structure including at least one heterocycle and at least one carbonyl group, wherein:

the unit structure includes at least one chemical structure including the at least one heterocycle and the at least one carbonyl group bonded to the at least one heterocycle, the at least one chemical structure includes a structure represented by chemical structural formula (C1) or (C2), and in each of the chemical structural formulae (C1) and (C2), m is an integer greater than 0 and less than or equal to 6:

(C1)

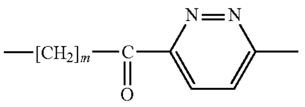

, (C2)

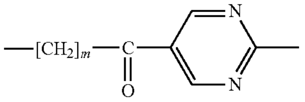

.

2. The dielectric composition of claim 1, wherein the at least one chemical structure further includes a structure represented by chemical structural formula (A):

(A)

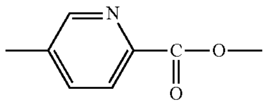

.

3. The dielectric composition of claim 1, wherein the at least one chemical structure further includes a structure represented by chemical structural formula (B):

(B)

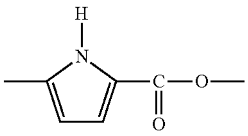

4. A dielectric composition comprising a polymer having a repeating unit of a unit structure including at least one heterocycle and at least one carbonyl group, wherein:

the unit structure includes a structure represented by any one of chemical structural formulae than (D1), (D2), (D3), or (D4), and in each of the chemical structural formulae (D1), (D3), and (D4), m is an integer greater than 0, and in the chemical structural formula (D2), m is an integer greater than or equal to 2:

(D1)

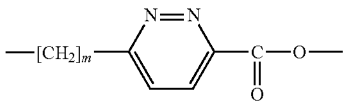

, (D2)

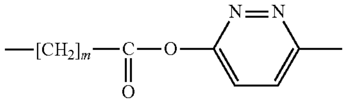

, (D3)

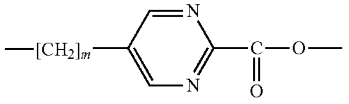

, (D4)

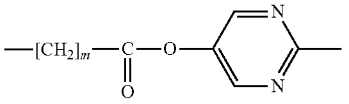

.

5. The dielectric composition of claim 4, wherein in each of the chemical structural formula (D1), (D3), and (D4), m is an integer greater than 0 and less than or equal to 5, and in the chemical structural formula (D2), m is an integer greater than or equal to 2 and less than or equal to 5.

6. A dielectric composition comprising two or more types of polymers each having a repeating unit of a unit structure including at least one heterocycle and at least one carbonyl group, wherein the unit structure included in the two or more types of polymers has a structure represented by any one of chemical structural formulae (A), (B), (C1), (C2), (D1), (D2), (D3), or (D4), and in each of the chemical structural formulae (C1), (C2), (D1), (D2), (D3), and (D4), m is an integer greater than 0:

(A)

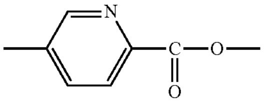

, (B)

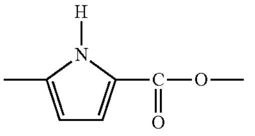

, (C1)

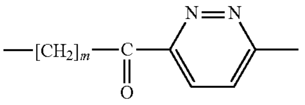

, (C2)

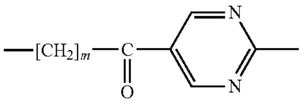

,

-continued (D1)

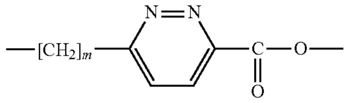 , (D2)

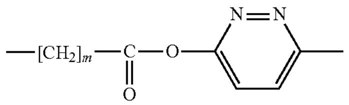 , (D3)

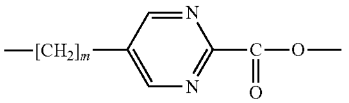 , (D4)

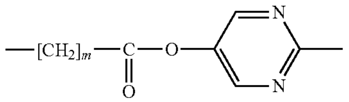 .

7. A dielectric film comprising the dielectric composition of claim 1.

8. A capacitor comprising the dielectric film of claim 7.

9. The dielectric composition of claim 4, wherein the at least one chemical structure further includes a structure represented by chemical structural formula (A):

(A)

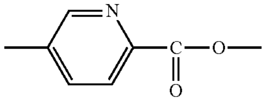 .

10. The dielectric composition of claim 4, wherein the at least one chemical structure further includes a structure represented by chemical structural formula (B):

(B)

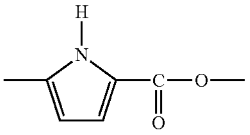 .

11. A dielectric film comprising the dielectric composition of claim 4.

12. A capacitor comprising the dielectric film of claim 11.

13. The dielectric composition of claim 6, wherein in each of the chemical structural formula (C1) and (C2), m is an integer greater than 0 and less than or equal to 6.

* * * * *